V. G. APPLE.
ELECTRICAL DISTRIBUTION SYSTEM AND APPARATUS.
APPLICATION FILED NOV. 26, 1906.
1,036,951.
Patented Aug. 27, 1912.
5 SHEETS—SHEET 1.
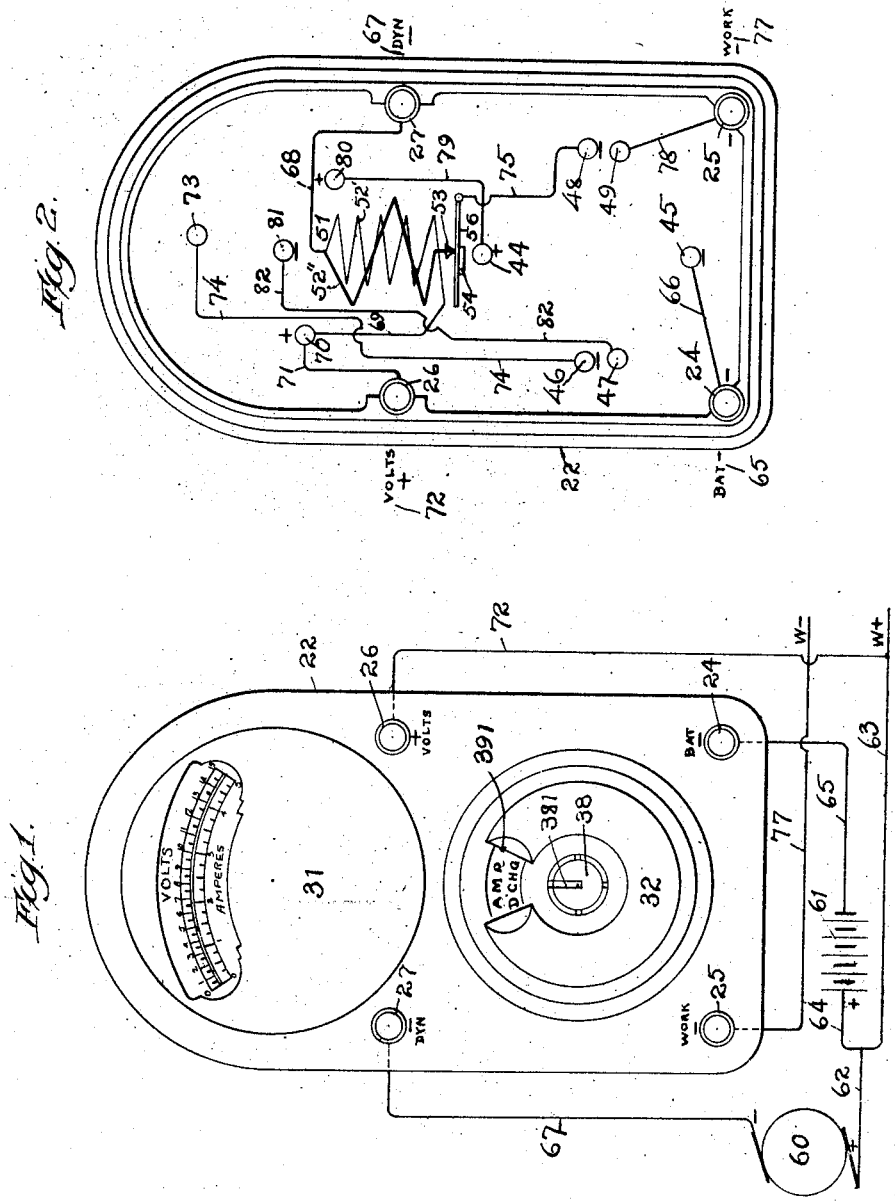

V. G. APPLE.
ELECTRICAL DISTRIBUTION SYSTEM AND APPARATUS.
APPLICATION FILED NOV. 26, 1906.

1,036,951.

Patented Aug. 27, 1912.

5 SHEETS—SHEET 2.

Witnesses
Ray White
Harry R. Levlute

Inventor
Vincent G. Apple
By Doree Bain & May
Attys

V. G. APPLE.
ELECTRICAL DISTRIBUTION SYSTEM AND APPARATUS.
APPLICATION FILED NOV. 26, 1906.

1,036,951.

Patented Aug. 27, 1912.

5 SHEETS—SHEET 4.

V. G. APPLE.
ELECTRICAL DISTRIBUTION SYSTEM AND APPARATUS.
APPLICATION FILED NOV. 26, 1906.
1,036,951.
Patented Aug. 27, 1912.
5 SHEETS—SHEET 5.
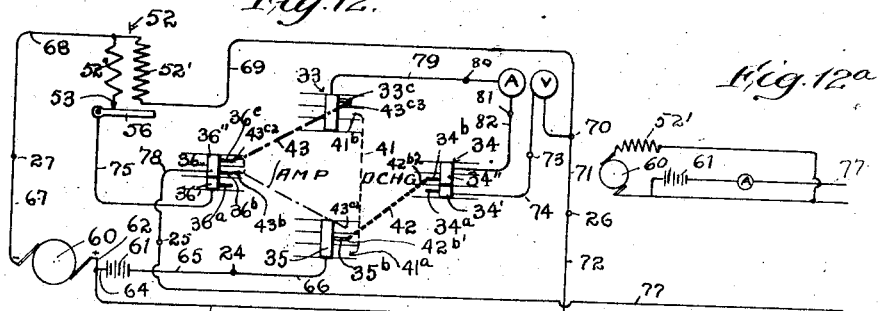
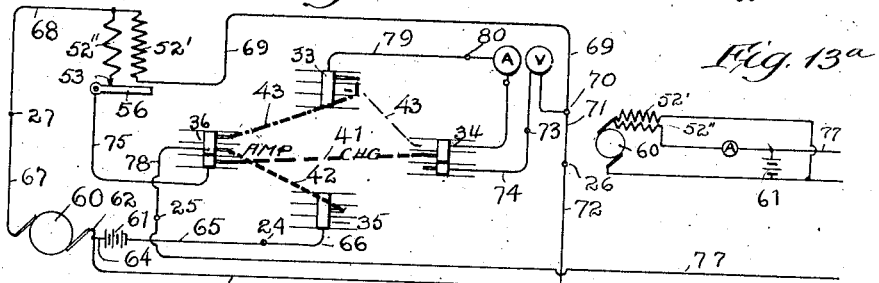
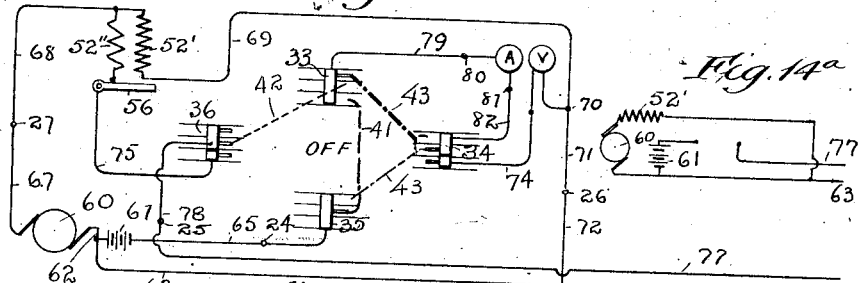
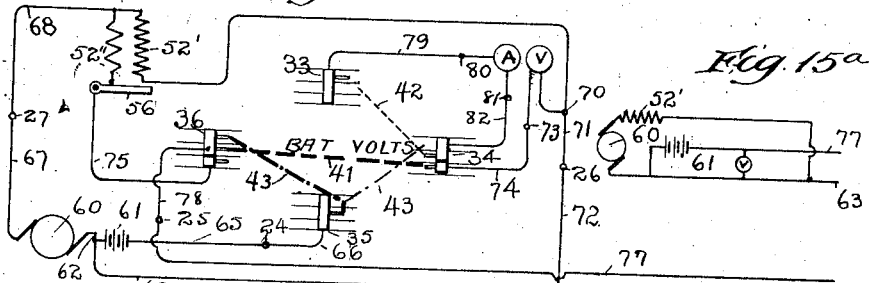
Witnesses
Ray White
Harry R. White
Inventor
Vincent G. Apple
By Foree Bain & May
Attys

UNITED STATES PATENT OFFICE.

VINCENT G. APPLE, OF DAYTON, OHIO.

ELECTRICAL DISTRIBUTION SYSTEM AND APPARATUS.

1,036,951.   Specification of Letters Patent.   Patented Aug. 27, 1912.

Application filed November 26, 1906. Serial No. 345,150.

*To all whom it may concern:*

Be it known that I, VINCENT G. APPLE, a citizen of the United States, residing at Dayton, in the county of Montgomery and State of Ohio, have invented certain new and useful Improvements in Electrical Distribution Systems and Apparatus, of which the following is a specification.

My invention relates to electric distribution systems and apparatus, and has particular reference to such systems as apply to the ignition of explosive charges in gas engines, and the like.

One of the primary objects of my invention is to provide for the use of a rotary uni-directional switch as a means of connecting in various relations the parts and circuits of the distribution system.

Another object of my invention is to provide an improved and simple switching apparatus for effecting the various circuit changes requisite to the establishment of different desired conditions in the system. And a yet further object of my invention is to provide an improved unitary apparatus, or instrument set, combining in convenient form the various instruments employed in the operation of the system.

With a view to attaining these and other objects which will become apparent to those skilled in the art from the following description, my invention consists in the combinations and arrangements of parts and features of construction hereinafter more fully described and specified in the claims.

Figure 3:
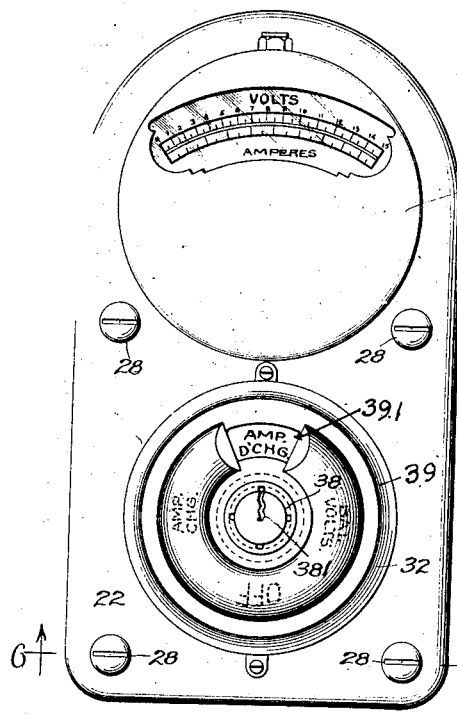
Figure 4:
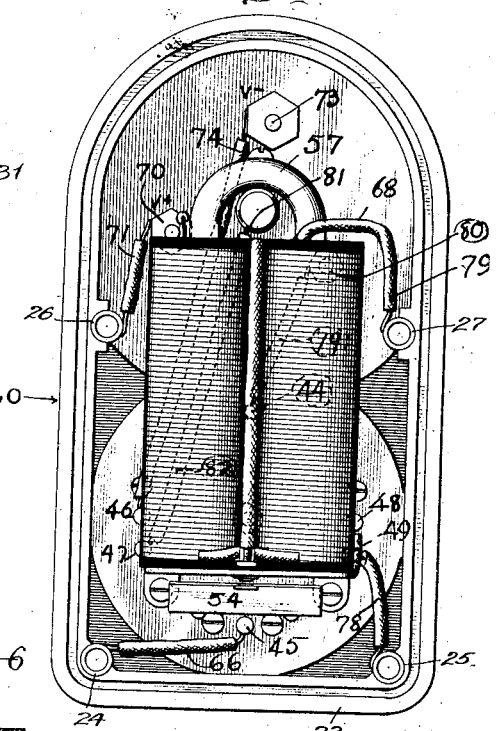
Figure 5:
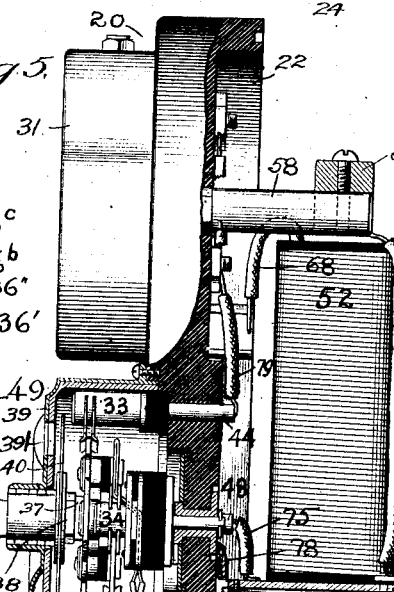
Figure 11:
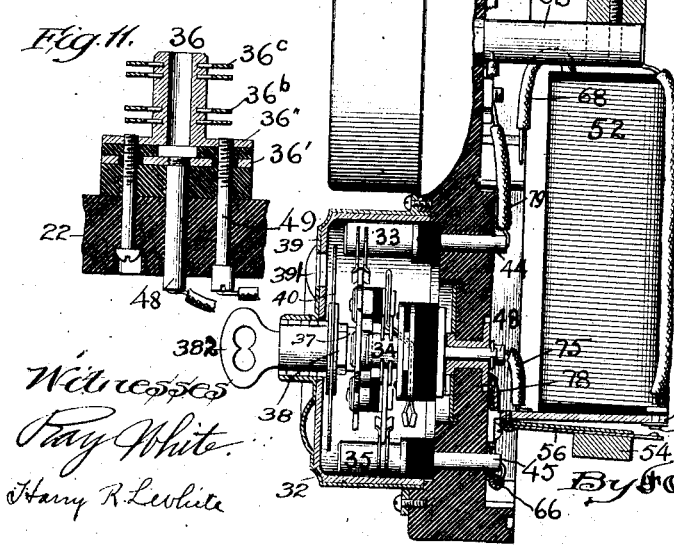
Figure 11A:
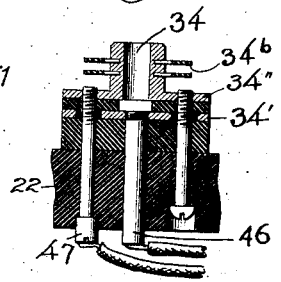
Figure 7:
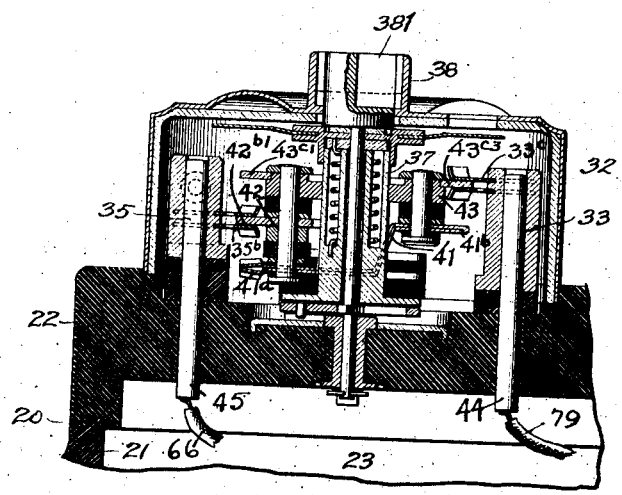
Figure 6:
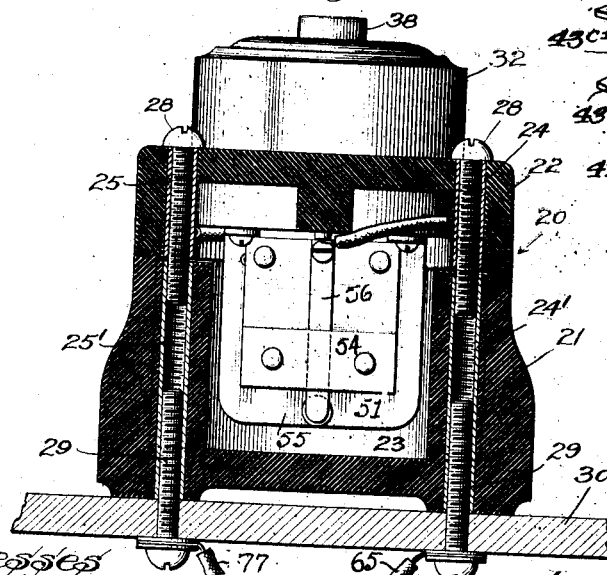
Figure 16:
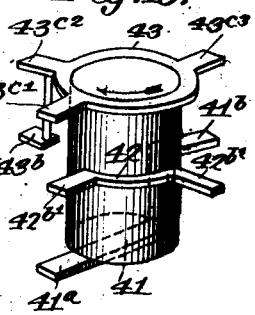
Figure 8:
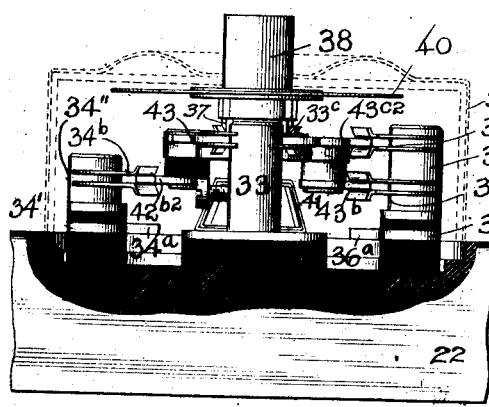
Figure 9:
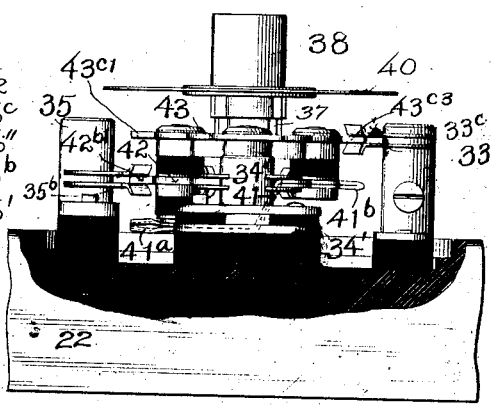
Figure 10:
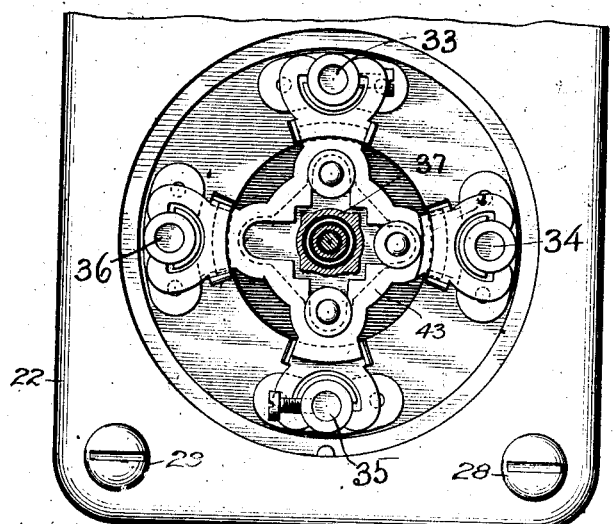

In the drawings: Figure 1 is a diagrammatic view illustrative of the electrical connections in an ignition system of a unitary instrument set of my invention. Fig. 2 is a diagram showing the interior wiring of the instrument set, as seen from the back thereof. Fig. 3 is a front elevation of the improved instrument set, and, Fig. 4 is a rear elevation of the instrument-bearing, cover-part thereof. Fig. 5 is a side elevation, with the parts in section, of the cover portion of the instrument set, showing the position of the instruments thereon. Fig. 6 is a transverse section through the instrument set, taken on line 6—6 of Fig. 3. Fig. 7 is an enlarged transverse section through the switch. Figs. 8 and 9 are side elevations of the switch, taken from different sides thereof. Fig. 10 is a plan view of the switch with parts in section. Figs. 11 and 11ª are details of two of the switch post constructions. Figs. 12, 13, 14 and 15 are diagrams illustrating the various connections effected by the switch when in its different positions of rotation. And, Figs. 12ª, 13ª, 14ª and 15ª are simplified diagrams of the connections established by the switch when the parts are in the positions shown in Figs. 12 to 15 respectively. Fig. 16 is a diagrammatic perspective view showing the relation of the switch connectors.

Throughout the drawings like numerals of reference refer always to like parts.

In general my invention provides a system and apparatus, whereby there may be connected with the ignition circuit, or other working circuit, and with each other, in various desired relations, a dynamo, a storage battery, an automatic cut out, an ammeter and a volt-meter. To this end I generally provide, in the form of a unitary instrument set adapted for convenient attachment to the dash-board of an automobile or to other suitable support, a casing, whereon or wherein are mounted all of the instrumentalities employed in the use of my system, save the dynamo, the battery and the working circuit appliances, which are properly wired to the instrument set.

In the drawings 20 indicates in general the instrument set unit, which comprises in its construction a casing made up of a base 21 and a cover or cap 22 fitting together to inclose an interior recess 23. At four points on the casing the cap 22 is provided with threaded metallic bushings 24, 25, 26 and 27, which, when the cap is in position stand immediately in register with the threaded bushings 24', 25', etc., extending through the entire depth of the walls of base 21. The cap and base are secured together by metallic screws 28, which take through the respective bushings of the cap 22, into the respective threaded bushings of the base 21. The base 21 may be connected to the dash board of an automobile, or other suitable support indicated at 30, (Fig. 6) by screws 29 taking therethrough into the bushings 24', 25', etc., the screws 29 constituting also terminals for the exterior wiring of the instrument so that the wiring is thereby wholly concealed on the side of the support opposite to that whereon the casing of the instrument set rests.

The instruments associated with the casing of the instrument set, comprise a combined ammeter and volt-meter indicated at 31, which device may be of any convenient or approved construction, and which forms, *per se*, no part of my invention. Its details of construction, therefore, are not shown and need not be described.

The quadruple throw, rotary snap switch is generally indicated at 32, and comprises in general four contact bearing posts 33, 34, 35 and 36, having thereon in different relations suitable contacts, which are arranged in several different tiers or stories. Associated with the several posts is a rotary snap switch mechanism, of any preferred construction, as to its snap mechanism, involving a rotatable stem 37, the outer end whereof, remote from its base or support, is fitted with a head 38 having therein a key hole 381 of any desired configuration, adapted to receive a key 382, which serves as a handle for the rotation of the rotary members of the switch. A cover or casing 39 conceals the switch mechanism, but is provided with a sight-aperture 391 through which is displayed a portion of a dial 40, carried by the stem 37, and bearing markings to indicate the then-existent connections of the set effected by the switch.

Three electrically separated connectors 41, 42 and 43, are provided which are adapted to effect electrical connection between the different contacts of the several posts, to properly connect the electrical devices in the system with respect to each other as the switch is moved from one position to another.

For convenient enumeration of the respective post connections and connector blades, I will use always in connection with the numbers applied thereto, exponents $a$, $b$ and $c$ indicative of the tier or story of the switch wherein the contact or blade is located, lettering successively from the bottom upward. As to the post contacts, post 33 is a single piece post, provided with a single contact $33^c$ and having a terminal 44, extending to the inside of the cover 22. Post 35 is likewise a single-piece post, provided with a single contact $35^b$ and a terminal 45. Post 34 is constructed, as best shown in Fig. $11^a$ of two relatively insulated members, a base $34'$ bearing a contact blade $34^a$, having connected thereto a terminal 46, and a superposed structure $34''$ secured to the base by insulated screws, one of which 47, constitutes a second wiring terminal. The superstructure $34''$ bears a contact $34^b$. The opposite post 36 is of like construction, its base $36'$ having a terminal connection 48 and bearing a contact $36^a$, while its insulated superstructure has a terminal wire connection 49 and bears contacts $36^b$ and $36^c$.

The several connectors 41, 42, 43, are insulated from each other and are arranged as follows: Connector 41 has a contact $41^a$ in the plane of the lowest tier of post contacts, and a diametrically opposite contact $41^b$, in the second tier. Connector 42 bears a contact $42^{b1}$, directly above contact $41^a$ and a second contact $42^{b2}$, one quadrant in rear thereof with reference to direction of rotation of the switch. The connector 43 has three contacts in the third tier and one in the second, the contact $43^{c1}$ alining with the contact $41^a$, the contacts $43^{c2}$ and $43^b$ being one quadrant in advance thereof with respect to the rotation of the switch, the remaining contact $43^{c3}$ being arranged a second quadrant in advance, or diametrically opposite the contact $43^{c1}$.

The automatic cut out, indicated generally at 51, is mounted on the back of the casing cover 22 and is constructed and wired in accordance with the teachings of Patent 666,920 to Monroe S. Clawson, dated Jan. 29th, 1901. In such device the coils are indicated at 52, and in the diagrammatic view $52'$ indicates the high resistance coil and the numeral $52''$ indicates the low resistance coil. 53 indicates the front contact, and 54 the permanent magnet armature movable into and out of contact with point 53. Structurally the diamagnetic connection 55 between the electromagnet poles carries the spring 56, whereon the armature 54 is mounted, and is itself secured to the inner side of the casing cover 22, the yoke 57 of the electromagnet being secured at its upper end to a post 58 likewise mounted in the cover 22.

In the diagrammatic representation of the wiring and electrical devices 60 indicates the dynamo, 61 a storage battery, A the ammeter portion of the instrument 31 and V the volt-meter portion of the instrument 31 (shown diagrammatically as separate devices). The wiring of the set is as follows: The positive terminal of the dynamo is connected by wire 62 on the one hand with the positive leg 63 of the working circuit, and also by wire 64 with the positive terminal of the battery 61. The negative terminal of said battery 61 is connected by wire 65 through the screw and bushing structure taking through the casing with the bushing 24, and from the bushing 24, wire 66 is connected with the terminal connection 45 of switch post 35. The negative terminal of the dynamo is connected by wire 67 with the sleeve 27, from which connects a wire 68 at its opposite end connecting with both coils $52'$ and $52''$ of the cut-out 51. The opposite terminal of the cut-out coil $52'$ is connected by wire 69 with the opposite terminal 70 of the volt-meter, from which connection is further made by wire 71 with the sleeve 26, which is exteriorly connected as by wire 72 with the positive leg 63 of the working circuit. The negative terminal 73 of the volt-meter is connected by wire 74 with the wire terminal 46 of the base portion of switch post 34.

The low resistance coil 52″ of the cut-out switch magnet 52 is connected with the contact 53, and the armature spring 56 is connected by wire 75 with the terminal 48, associated with the base 36′ of switch post 36. The negative leg of the working circuit, indicated at 77, is connected with the sleeve 25 which is connected by wire 78 with the terminals 49 associated with the superstructure of the post 36. The terminal 44 of the switch post 33 is connected by wire 79 with the positive terminal 80 of the ammeter coil, the negative terminal 81 for the ammeter coil being connected by wire 82 with the terminal 47 of switch post 34.

By reference to the diagrams of the connections, Figs. 12 to 15 inclusive, it will be seen that there is provided a constant, uninterrupted circuit for the dynamo, including therein the high resistance coil 52′ of the automatic cut-out relay. Such circuit may be traced to positive pole of dynamo 60 by wires 63, 72, 71 and 69 to the winding 52′ of the magnet 52, thence by wires 68 and 67 back to the negative pole of the dynamo.

The four positions of the switch are such as to produce the following conditions in the circuit.

1. To cut both the dynamo and battery out of the working circuit, and disable both meters, which position is indicated by the word "Off" on the dial reading.

2. To connect the battery with the working circuit with the volt-meter bridged across the circuit. This position is indicated by the symbol "Batt volts" on the dial.

3. To maintain the same connection of battery and working circuit, but with the ammeter in series, indicated on the dial by "Amp dchg", as an abbreviation of "amperes discharging", and;

4. To connect the dynamo and battery in parallel with the working circuit, with the ammeter in series between the two sources of current supply, the position being indicated by the abbreviation on the dial "Amp chg", for "amperes charging".

Under ordinary working conditions the switch is thrown to position to display the symbol "Amp. chg", at the dial reading opening, and under such conditions the connections established through the switch are as follows: (Fig. 13). Connection 41, connects the lower portion of post 36 with the upper portion of post 34; connection 42 connects the upper portion of post 36 with post 35; and the connection 43 connects also the upper portion of post 36 with post 33, all as shown in Fig. 13. Under these conditions in addition to the constant circuit, including the high resistance coil of the magnet heretofore adverted to, there is established a circuit as follows: From dynamo 60 through wire 62, the working circuit wire 63, return wires 77 and 78 to the upper portion of post 36, thence by connection 43 to post 33, thence by wires 79 through the ammeter returning by wire 82 to the upper portion of post 34, thence by connection 41 to the lower portion 36′ of post 36, and from there by wire 75 to the armature spring 56 and, (if said armature be closed upon its contact) through the coil 52″ of the automatic switch and wires 68 and 67 back to the dynamo. Between the legs of this circuit is bridged the battery, such bridge connection being established by wires 64, 65, 66, post 35 and connection 42 to the superstructure of post 36, which is in the return leg of the circuit above described, at a point between the working or translating devices and the ammeter, so that in its simplest form the circuits established and last traced are as illustrated in Fig. 13ª. Under such conditions obviously the dynamo charges the battery which is connected with the working circuit, and the ammeter is included in series between the dynamo and battery. Under such conditions it will be obvious that the automatic cut-out magnet will perform its well known functions, as described in the Clawson patent heretofore mentioned, the winding being such that the armature is not attracted to close the connection between the dynamo and battery at point 53, 56, until the current has reached the desired voltage, when the energization of the high resistance coil will attract the armature, closing the circuit between the dynamo and storage battery and conditioning the parts for normal operation. If at any time the speed of the dynamo becomes so slow that the voltage drops below the voltage of the storage battery, then the connection is automatically broken for such reduction of voltage of the dynamo results in a momentary back-flow of current from the battery through the dynamo, the low resistance coil, the ammeter to the battery again, as may readily be seen in Fig. 13ª, such reversal of current flow through the low resistance coil serves to decrease the energization of the magnet to such an extent as to permit the polarized armature to be retracted by its spring, breaking the connection between the dynamo and battery. When the voltage of the dynamo is restored to normal, the circuit is again closed.

When the snap switch is advanced one step, to throw its connectors to the position shown in Fig. 14, and displays the symbol "Off" at the dial-reading aperture, the working circuit is broken and the battery disconnected from the dynamo, as indicated in Fig. 14ª, it being clear in consideration of the diagram 14 and the switch construction described, that the superstructure 36, to which one leg of the working circuit is connected, is engaged only by the connection 42, the opposite end of which is free or disconnected, while the post 35 connected with battery wire 66 has engaged therewith only the connector 41 the opposite end of which is free, and the wire 75, which may be connected through the low resistance coil 52″, with the positive pole of the dynamo, has no connector in operative association therewith under such conditions. When the switch is advanced to the next position the parts assume the relation shown in Fig. 15; the connector 41 connects the superstructure of post 36 with the base structure of post 34, the connector 42 is idle, and the connector 43 connects the superstructure of post 36 with post 35. Under these conditions current from the generator can not flow through the low resistance winding of the magnet for the reason that no connector engages with the contact 36ª of post 36, but the battery circuit is completed by wires 65 and 66, post 35, connector 43 with the superstructure 36″ of post 36, to which one leg of the working circuit is connected, the remaining leg being connected directly with the battery, through wire 64. The volt-meter is bridged between the working circuit wires intermediate the battery and the translating devices, there being established a circuit from the wire 63 on one side of the battery, through wires 73 and 71 to the volt-meter, and from the other terminal of the volt-meter by wire 74 to the base structure of switch post 34, connected by connector 41 with the superstructure of post 36, which, it will be remembered, is a fixed terminal of the return leg 77 of the working circuit. This is diagrammatically illustrated in simplified form in Fig. 15ª, and it will be apparent that such connection of the circuit throws the battery into working association with the translating devices, and bridges the volt-meter across the connection in a proper manner to afford a reading of the voltage of the battery. In the remaining or fourth position, indicated in Fig. 12, the same connections remain established save that the volt-meter is cut out of service and the ammeter connected in series between the battery and the translating devices. Under such conditions the connector 41 is out of service; connector 42 connects the superstructure 34″ with post 35 and the connection 43 connects superstructure 36″ of post 36 with the post 33. Now current from the battery flows through the working circuit wire 63 returning by wires 77 and 78 to post section 36″, thence by connections 43, post 33, by wire 79 to the ammeter, returning through wire 82 to the post section 34″, thence by connection 42 to post 35, and from there by wires 66 and 65 to the negative terminal of the battery.

Having thus described my invention, what I claim and desire to secure by Letters Patent of the United States, is:

1. In an electric distribution system, the combination with a dynamo, a storage battery, and a meter, of an automatic cut out, comprising a circuit controlling armature and a double wound electromagnet, having a winding arranged for inclusion in closed circuit with the dynamo, and its other winding in a circuit between the dynamo and battery controlled by the armature, and a unidirectional rotary switch for controlling the circuit connections of the dynamo, storage battery, meter and working circuit.

2. In an electric distribution system, the combination with a dynamo, a storage battery, an ammeter, a volt meter, circuit connections including a working circuit, and an automatic cut-out comprising an armature and a double wound electromagnet having one winding in constant circuit with the dynamo and the other winding in a circuit controlled by the armature, of a rotary switch providing stationary contact parts one connected with the dynamo under normal operating conditions, and others connected with the battery, ammeter, voltmeter and working circuit, and connectors movable in unison, arranged to successively effect different connections between the parts, to connect the battery with the working circuit and the dynamo with the battery through the armature-controlled coil of the cut out and the ammeter; to connect the battery in proper circuit with the ammeter and the working circuit to the exclusion of the dynamo; and to disconnect the dynamo and battery from the working circuit, each other and the meters.

3. In an electric distribution system, the combination with a dynamo, a storage battery, and circuit connections including a working circuit, of a unitary, self contained instrument set comprising ammeter and voltmeter mechanism, an automatic cut-out comprising an armature and a double wound coil having one winding arranged for inclusion in circuit with the dynamo, independently of the battery, and another controlled by the armature, arranged for inclusion in circuit between the dynamo and battery, a rotary switch comprising stationary contact parts under normal operating conditions connected with the dynamo, battery working circuit and meter-mechanism, and a connecting structure movable as a unit, to control the connections of the meter mechanism, dynamo, battery, and working circuit; and a casing carrying the meter mechanism and switch in convenient association and having mounted in the interior thereof the automatic cut-out.

4. In an electric distribution system, a dynamo, storage battery and circuit connections including a working circuit, having combined therewith a unitary instrument set comprising a hollow casing providing exterior terminals for connection with the dynamo, storage battery and working circuit, an automatic cut-out comprising an armature and a double coil providing one winding having connections for inclusion between the dynamo terminals to the exclusion of the battery, and a winding controlled by the armature having connections for inclusion between the dynamo and battery, said cut-out being mounted within the casing, electrical meter mechanism mounted on the casing, and a multiple post rotary switch mounted also on the casing, providing stationary contacts connected under normal operating conditions with the meter mechanism, the armature-controlled cut-out coil, and the dynamo, battery and working circuit terminals, a rotary operating part, and connectors movable by said operating part to successively effect different connections between the stationary contact parts to effect desired connections and disconnections of the battery, dynamo, cut-out, working circuit and meter mechanism.

5. In an instrument set for incorporation in an electric distribution system, a two piece casing comprising a base and a cover, electrical meter-mechanism mounted with respect to the casing to be readable from the exterior of the cover, a rotary switching mechanism mounted for operation from the exterior of the casing, an electrical cut-out inclosed within the casing, said cut-out and meter being controlled by the switch, and exterior terminal parts connected interiorly with the switch, meter and cut-out mechanism.

6. In an instrument set, for incorporation in an electric distribution system, a two piece casing comprising a base and a cover, electrical instruments carried by the cover, bushings taking through the cover, electrically connected with the instruments, bushings taking through the base, metallic-connections between said bushings for connecting the casing parts and establishing electrical connection between the bushings, and metallic casing-attaching devices connected with the base-bushings and affording means of attachment of outside wiring to the instruments carried by the casing cover.

In testimony whereof I hereunto set my hand in the presence of two witnesses.

VINCENT G. APPLE.

In the presence of—
W. D. BROWN,
E. M. GRIER.